US005826118A

United States Patent [19]
Koga et al.

[11] Patent Number: 5,826,118
[45] Date of Patent: Oct. 20, 1998

[54] CAMERA HAVING A CONTROLLER TO DETERMINE A REFERENCE POSITION OF A LENS BARREL

[75] Inventors: Masayuki Koga, Fuchu; Toru Kosaka, Zama, both of Japan

[73] Assignee: Nikon Corporation, Tokyo, Japan

[21] Appl. No.: 812,332

[22] Filed: Mar. 5, 1997

Related U.S. Application Data

[63] Continuation of Ser. No. 384,558, Feb. 6, 1995, abandoned.

[30] Foreign Application Priority Data

Feb. 4, 1994 [JP] Japan .................................. 6-012825

[51] Int. Cl.[6] .............................. G03B 1/18; G03B 3/10
[52] U.S. Cl. ............................ 396/87; 396/277; 396/280
[58] Field of Search ................................ 396/85, 87, 88, 396/277, 280, 86

[56] References Cited

U.S. PATENT DOCUMENTS

| | | | |
|---|---|---|---|
| 4,924,253 | 5/1990 | Imai et al. ............................... | 354/400 |
| 5,204,715 | 4/1993 | Nakanishi et al. .................. | 354/195.13 |
| 5,208,625 | 5/1993 | Suekane ................................... | 354/402 |
| 5,255,035 | 10/1993 | Kichima ................................... | 396/87 |
| 5,257,053 | 10/1993 | Kobayashi et al. ................... | 354/195.1 |
| 5,280,317 | 1/1994 | Haraguchi et al. ................... | 354/195.1 |
| 5,302,991 | 4/1994 | Nakayama .......................... | 354/195.12 |
| 5,345,290 | 9/1994 | Watanabe et al. ...................... | 354/400 |
| 5,363,164 | 11/1994 | Kobayashi et al. ................... | 354/195.1 |
| 5,396,306 | 3/1995 | Kawasaki et al. ..................... | 354/195.1 |
| 5,486,888 | 1/1996 | Shiina et al. .............................. | 396/87 |
| 5,640,616 | 6/1997 | Ishiguro et al. .......................... | 396/87 |

*Primary Examiner*—David M. Gray
*Assistant Examiner*—Michael Dalakis

[57] ABSTRACT

A camera including a camera body, a lens barrel, a power supply source to supply power to circuits of the camera, and a main switch to switch the power supply source between a power supplied status and power-not-supplied status. The lens barrel has a first position which is where the lens barrel is completely retracted within the camera body, a second position which is where the lens barrel is set when the main switch has gone into the power supplied status, and a reference position which is for positional control of the lens barrel with respect to the camera body. The reference position is between the first position and the second position of the lens barrel. If a new battery is inserted into the camera, the lens barrel is not moved, thereby preventing a camera holder from dropping the camera.

10 Claims, 5 Drawing Sheets

CAMERA HAVING A CONTROLLER TO DETERMINE A REFERENCE POSITION OF A LENS BARREL

This application is a continuation of application Ser. No. 08/384,558, filed Feb. 6, 1995, now abandoned.

BACKGROUND OF THE INVENTION

1. Field of the Invention

The present invention relates to a camera having a lens barrel and a controller for controlling the lens barrel and, more particularly, to a camera which determines a reference position of the lens barrel using the controller.

2. Description of the Related Art

Cameras are known which perform control of the position of a lens barrel relative to a camera body in the optical axis direction by photoelectrically counting pulses. In such instances, it is necessary to set a reference position of the lens barrel with respect to the camera body in the optical axis direction. For this purpose, for example, a reference point is located on the lens barrel and a reference position sensor is located on the camera body. Then, when the sensor senses the reference position of the lens barrel, the positional relationship of the lens barrel and the camera body is set as the reference position.

The reference position of the lens barrel with respect to the camera body in the optical axis direction is set to a barrel reset end, an autofocus start position or, in a zoom lens, to a wide angle end. The barrel reset end refers to the position in which the lens barrel is collapsed into the camera when the camera is not in use. The autofocus start position is the position to which the lens barrel extends after the main switch of the camera has been turned ON, and lens barrel movement starts from this position. The wide angle end refers to when the lens barrel is at the extreme wide angle side.

In the conventional cameras described above, there are instances where the battery is replaced because it has fallen out or because it needs to be changed. In such cases, because data on how much the lens barrel has moved from the reference position is not recorded or stored, the central processing unit (hereinafter referred to as the "CPU") no longer knows the positional relationship between the lens barrel and the camera body in the optical axis direction. For this reason, it has been necessary to move the lens barrel in the optical axis direction in order for the CPU to sense the reference position of the lens barrel.

In the conventional cameras described above in which the reference position of the lens barrel is the wide angle end position, a large number of pulses are photoelectrically read for the purpose of driving the lens barrel from the wide angle end to the reset end. For this reason, when the lens barrel is driven from the wide angle end to the reset end, there is a possibility that the number of pulses would be misread. In such a case, the lens barrel would be retracted into the camera by an extra amount based on the misread number of pulses, and there is a danger that damage would be caused to the camera.

Also, in these cameras in which the reference position of the lens barrel is the wide angle end position, sensing of the reference position becomes unstable when the photographer's hand touches the lens barrel when the lens barrel is at the wide angle end, and there is a possibility that the CPU would recognize an erroneous position as the reference position.

In the above-described cameras in which the reference position of the lens barrel is the reset end position, a large number of pulses also are photoelectrically read for the purpose of driving the lens barrel from the reset end to the wide angle end. For this reason, when the lens barrel is driven from the reset end to the wide angle end, there is a possibility that the number of pulses would be misread. In such a case, there is a problem in that the lens barrel would be extended from the camera by an extra amount based on the misread number of pulses.

Also, in these cameras in which the reference position of the lens barrel is the reset end position, sensing of the reference position becomes unstable when the photographer's hand touches the lens barrel when the lens barrel is at the reset end, and there is a possibility that the CPU would recognize an erroneous position as the reference position.

In single focus lens cameras, in the same way, a large number of pulses are photoelectrically read for the purpose of driving the lens barrel from the focus start position to the reset end, and thus, the same types of problems may occur.

As described above, there have been problems in that when the reference position is mistaken and the lens barrel is driven by an extra amount accurate focal length adjustment and accurate autofocus can not be performed.

Also, in these types of conventional cameras, when the battery is replaced, the lens barrel is moved in the optical axis direction. For this reason, there is a problem in that when the lens barrel is moved inadvertently, a possibility arises that the person holding the camera would drop the camera.

In particular, conventional cameras move the lens barrel from the condition in which the lens barrel is collapsed when the position of the lens barrel is the reset end position and the battery is replaced, so that there is a relatively high probability that the person holding the camera would be surprised and drop the camera.

The inventors have discovered the above-noted problems and have developed solutions to these problems.

SUMMARY OF THE INVENTION

Accordingly, it is an object of the present invention to provide a camera having a lens barrel and a controller for accurately controlling the position of the lens barrel.

It is another object of the present invention to provide a camera having a lens barrel and a controller for controlling a position of the lens barrel in which a photographer will not be induced to dropping the camera when a battery of the camera is replaced.

It is still yet another object of the present invention to store the reference position of the lens barrel relative to a camera body even when a battery of the camera is replaced.

Additional objects and advantages of the invention will be set forth in part in the description which follows and, in part, will be obvious from the description, or may be learned by practice of the invention.

Objects of the present invention are achieved by providing a camera which includes a camera body, a lens barrel, a power supply source which supplies power to the circuits of the camera, and a main switch which switches the power supply source between a power supplied status and a power-not-supplied status. The lens barrel has a first position in which the lens barrel is fully retracted within the camera body and a second position which is set when the main switch has gone into the power supplied status. The lens barrel also has a lens barrel reference position which is for positional control of the lens barrel with respect to the camera body, and is between the first position and the second position of the lens barrel.

Objects of the present invention may also be achieved with a camera including a camera body, a lens barrel having at least a first position collapsed inside the camera body and a reference position with respect to the camera body, and a second position which is reached by the lens barrel when the main switch has been turned ON, and a controller which performs positional control of the lens barrel with respect to the camera body and performs reset driving in order to set the reference position for the lens barrel when a new battery is installed in the camera.

The camera according to embodiments of the present invention includes a determination unit, which determines whether or not the lens barrel is in the first position. When the determination unit determines that the lens barrel is in the first position, the controller performs control so that the lens barrel is held in the first position without performing the above-mentioned reset operation if a new battery has been installed.

Therefore, the probability is reduced of the lens barrel being driven inadvertently, thereby causing the photographer holding the camera to drop the camera. Also, the reference position, which is for positional control of the lens barrel with respect to the camera body, is set between the first position and the second position of the lens barrel so that the amount by which the lens barrel is driven in order to read the reference point is reduced. For this reason, accurate focal length adjustment and accurate autofocus control can be performed.

DESCRIPTION OF THE PREFERRED EMBODIMENTS

Figure 1:
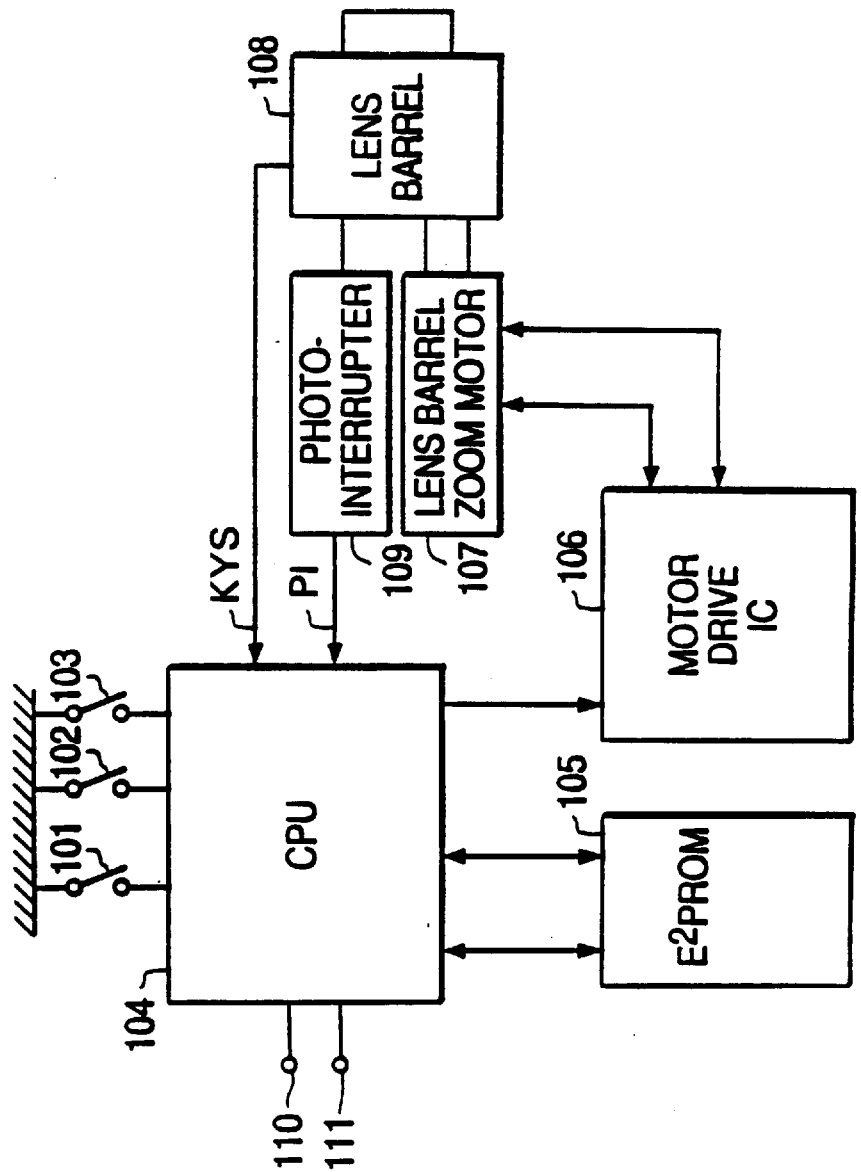
FIG. 1 is a block diagram of circuits for controlling a lens barrel of a camera according to an embodiment of the present invention.

FIG. 1 is a block diagram of circuits for controlling a lens barrel 108 of the camera according to an embodiment of the present invention. When a main switch 101 of the camera is in an ON position, power is supplied to the circuits of the camera from a power source (not shown in the figure). A zoom up switch 102, when in the ON position, increases a focal length of the lens barrel 108. A zoom down switch 103, when in the ON position, decreases the focal length of the lens barrel 108.

When the zoom up switch 102 has been turned ON, a CPU 104 confirms a position of the lens barrel 108 at an E$^2$PROM (EEPROM) 105, in which the position of the lens barrel 108 is stored. Then, when the CPU 104 recognizes that the lens barrel 108 is extended past a wide angle (W) end and is at a position other than a telephoto (T) end, it outputs a zoom up signal to the motor drive integrated circuit (IC) 106. The motor drive IC 106 outputs a lens barrel extension drive signal to the lens barrel zoom motor 107, causing the lens barrel 108 to zoom up.

When the zoom down switch 103 has been turned ON, the CPU 104 reads the lens barrel position data from the E$^2$PROM 105, in which the position of the lens barrel 108 is stored. Then, when the CPU 104 recognizes that the lens barrel 108 is extended past the W end and is at a position other than the W end, it outputs a zoom down signal to the lens barrel motor drive IC 106. The motor drive IC 106 outputs a lens barrel retraction drive signal to the lens barrel zoom motor 107, causing the lens barrel 108 to zoom down.

For the purpose of positional control of the lens barrel 108, it is necessary to set a reference position of the lens barrel 108 with respect to the camera body in the optical axis direction. Then, positional control of the lens barrel 108 is performed according to the number of pulses from the reference position recorded by a photointerrupter 109.

An input terminal 110 sets and inputs the reference position of the lens barrel 108 in the CPU 104. Also, an output terminal 111 reads and sets the reference position which has been written in the E$^2$PROM 105.

Figure 2A:
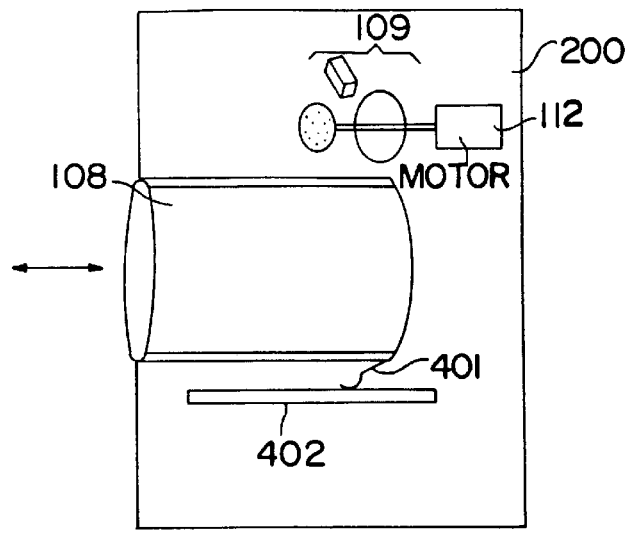
FIG. 2(A) is a cross-sectional view showing portions of the camera of FIG. 1 which set a reference position of the lens barrel when the lens barrel is at a reset end position.
Figure 2B:
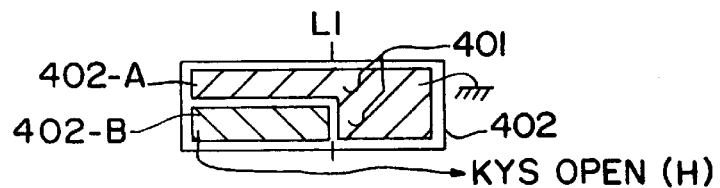
FIG. 2(B) shows a plan view of a brush pattern shown in FIG. 2(A).
Figure 2C:
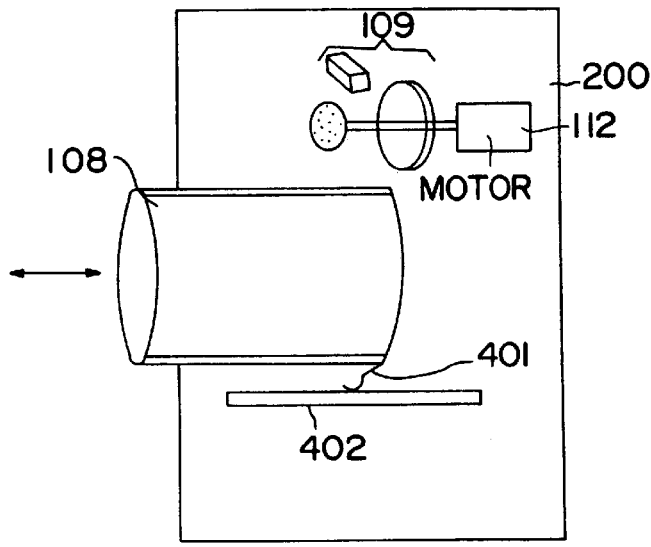
FIG. 2(C) is a cross-sectional view showing portions of the camera of FIG. 1 which set a reference position of the lens barrel when the lens barrel is at a wide angle end position.
Figure 2D:
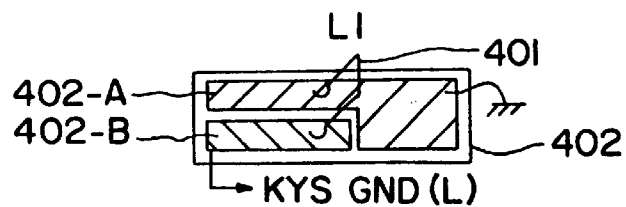
FIG. 2(D) shows a plan view of a brush pattern shown in FIG. 2(C).

FIGS. 2(A) through 2(D) show portions of the camera which set the reference position. FIGS. 2(A) and 2(C) show a lens barrel 108 having a brush 401 arranged integrally with the lens barrel 108. A brush pattern 402 is arranged in the camera body 200 and FIGS. 2(B) and 2(D) show a plan view of the brush pattern 402 having a pattern 402-A and a pattern 402-B. A KYS signal (discussed in greater detail below) is generated, based on the electrical potential of the pattern 402-B and sent to the CPU 104 (see FIG. 1). When the lens barrel 108 moves in the direction of the optical axis, the brush 401 moves on the brush pattern 402.

In FIG. 2(A), the lens barrel 108 is in the reset end position first position At this time, the brush 401 is in contact with only the pattern 402-A. The patterns 402-A (see FIG. 2(B)) and 402-B are not passing electric current. Consequently, the electrical potential of the pattern 402-B is HIGH, and the KYS signal of a HIGH level is generated.

In FIG. 2(C), the lens barrel 108 is in the wide angle end position. (the wide angle end position is a second position in this instance, but FIG. 2(C) may also be representative of the autofocus start position). At this time, the brush 401 is in contact with both the pattern 402-A and the pattern 402-B (see FIG. 2(D)). The pattern 402-A and the pattern 402-B in this situation are passing electric current. Consequently, the potential of the pattern 402-B is LOW, and a KYS signal of a LOW level is generated.

The boundary line L1 of the pattern 402-A and the pattern 402-B is the reference position. As shown in FIGS. 2(A) and 2(C), the reference position L1 is arranged between the reset location and the wide angle end location.

A status of lens barrel drive control when a battery has been installed in the camera will be explained using the flow chart of FIG. 3. Lens barrel drive control begins in step S300. After the battery has been installed in step S301, in step S302 the position of the lens barrel 108 is read from the E²PROM 105, and a determination is made as to whether it is at the reset end (as discussed above, the reset end refers to the position in which the lens barrel is fully collapsed within the camera body). When the position of the lens barrel 108 is at the reset end, the step RETURN is proceeded to without any further operations. When the position of the lens barrel 108 is not at the reset end in step S302, step S303 is proceeded to, and lens barrel reset driving is executed.

In step S304, a determination is made as to whether a KYS signal is ON or OFF. As will be explained below, the KYS signal is a signal for finding out the relative position of the reference position of the lens barrel 108.

FIG. 1 shows the KYS signal being sent from the lens barrel 108 to the CPU 104. If the KYS signal is ON, it indicates a condition in which the lens barrel 108 has extended from the camera body further than the reference position. If the KYS signal is OFF, it indicates a condition in which the lens barrel 108 has retracted into the camera body further than the reference position.

Figure 3:
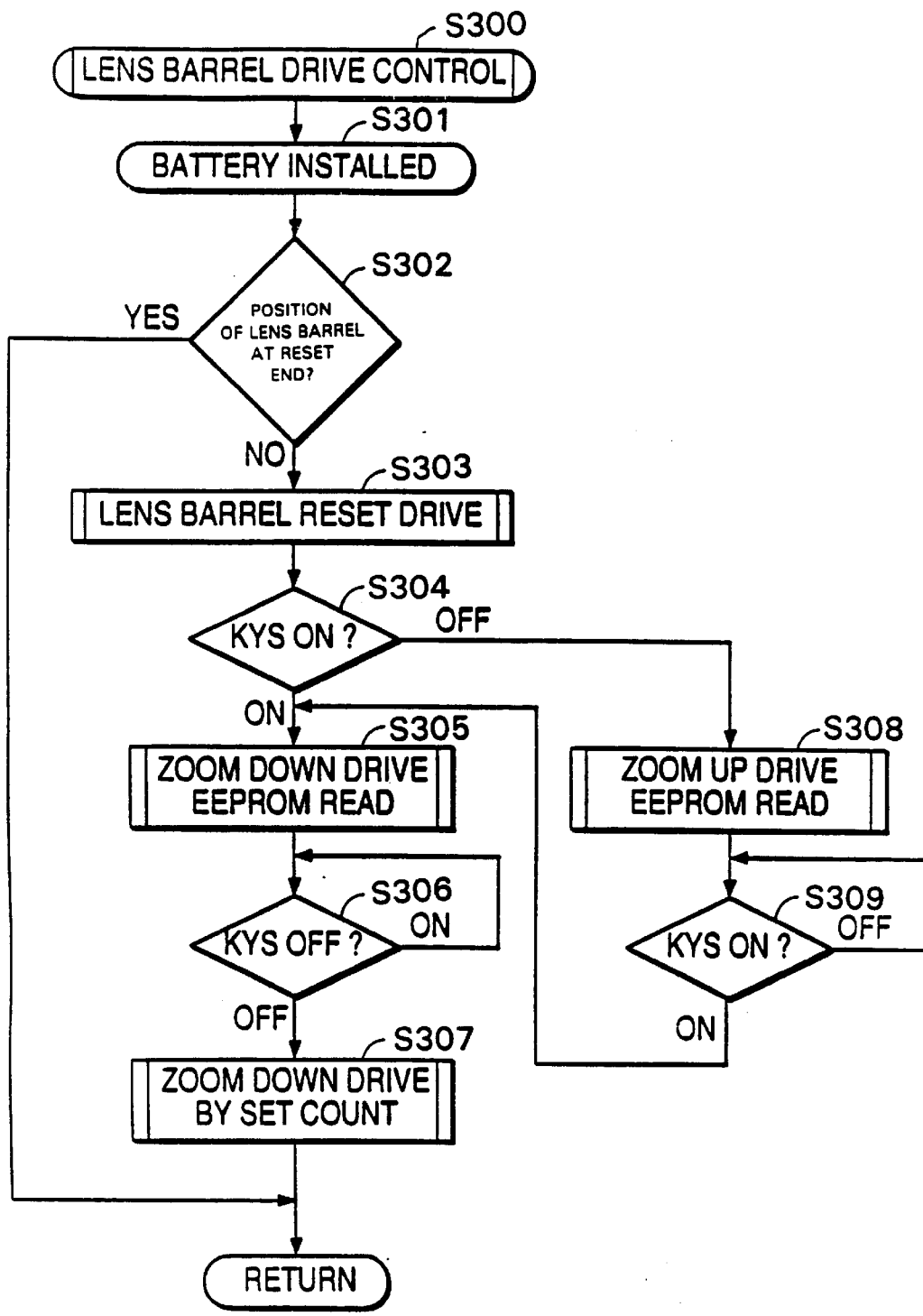
FIG. 3 is a flow chart showing lens drive control conditions when a battery is installed in the camera of the embodiment of the present invention.

When the KYS signal is ON in S304 in FIG. 3, zoom down driving is started in step S305. The data necessary for driving is read from the E²PROM 105. In step S306, the condition of the KYS signal, which indicates the reference position, is monitored while zooming down the lens barrel 108, and a determination is made as to whether the KYS signal is ON or OFF. When the KYS signal is ON in step S306, this determination is repeated. When it is OFF in step S306, driving of the lens barrel 108 to the reset position is started in step S307. As discussed previously, the reset position of the lens barrel 108 refers to the condition in which the lens barrel 108 has fully collapsed into the camera body.

Then, zoom down driving according to the data stored in the E²PROM is executed, and the lens barrel 108 is driven to the reset position, which is the condition in which the lens barrel 108 is collapsed into the camera. Then, reverse current braking, which is used for stopping the lens barrel 108 according to the data stored in the E²PROM, is performed, and the step RETURN is proceeded to after the lens barrel 108 has been stopped at the proper intended position.

If the KYS signal is OFF in step S304, the lens barrel is extended, and zoom up driving is performed in step S308. The data necessary for zoom up driving of the lens barrel 108 until the KYS signal comes ON is read from E²PROM 105. The KYS signal condition is monitored in step S309 while zooming up, and a determination is made as to whether the KYS signal is ON or OFF. When the KYS signal is ON in step S309, this determination is repeated. When it is OFF in step S309, step S305 is proceeded to.

FIGS. 4(A) through 4(D) are diagrams showing control signals of the lens barrel 108 of the camera when the lens barrel 108 is at different positions relative to the camera body according to the embodiment of the present invention. The reference position of the lens barrel 108 with respect to the camera body in the optical axis direction is between the reset end and the wide angle end of the lens barrel 108.

Figure 4A:
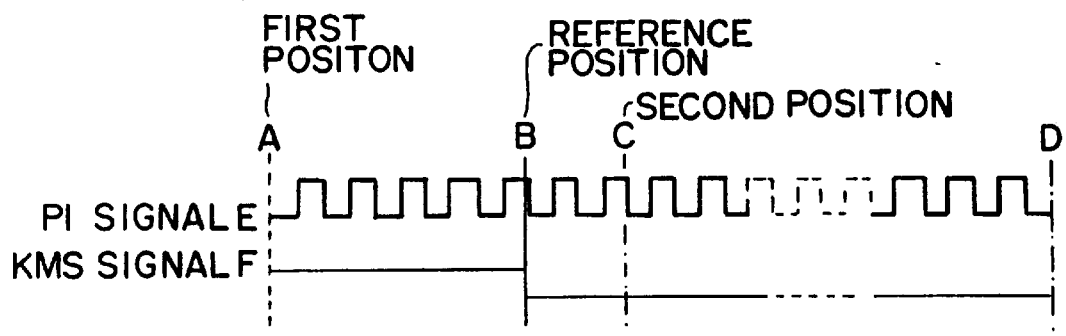
FIGS. 4(A) through 4(D) are diagrams showing lens barrel control signals for a lens barrel of the camera when the lens barrel is between different positions relative to the camera body according to the embodiment of the present invention.

FIG. 4(A) shows the KYS (reference position) signal and the PI signal. As shown in FIG. 1, the "PI signal" is an abbreviation for output signals of the photointerrupter 109 which photoelectrically control the driving of the lens barrel 108. In FIG. 4(A),"A" indicates the reset end of driving the lens barrel 108 and "B" indicates the reference position of the lens barrel 108. "C" indicates the position of the lens barrel 108 at the extreme wide angle side and "D" indicates that the lens barrel 108 is on the extreme telephoto side. "E" represents the PI signal from the photointerrupter 109 and "F" represents the KYS (reference position) signal indicative of the location of the reference position of the lens barrel relative to the reference position.

The driving of the lens barrel 108 is controlled according to the PI signal between the reset end and the telephoto end, and the position of the lens barrel 108 is recorded in the E²PROM as the PI signal count from the reference position. Meaningless lens barrel driving can be omitted when the lens barrel 108 is at the reset end according to the data stored in the E²PROM.

Figure 4B:
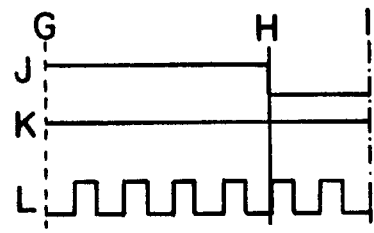

FIG. 4(B) shows the KYS (reference position) signal, the PI signal and the driving signals when the lens barrel 108 is driven from "A"–"B" to "C". "G" indicates the start time of the lens driving, "H" indicates the time when the lens barrel 108 reaches the reference position and "I" indicates the time when the lens barrel 108 reaches the wide angle end position of the lens barrel 108.

When the main switch 101 is operated, the CPU 104 outputs a zoom up signal to the motor drive IC 106 according to the driving of the lens barrel 108 until the KYS (reference position) signal "J" goes from high to low. The motor drive IC 106 outputs a lens barrel driving signal "K" for driving the lens barrel zoom motor 107, and the lens barrel 108 is extended. "L" is the PI signal from the photointerrupter 109 during this time period.

If the KYS (reference position) signal has changed from high to low, the CPU 104 detects the fact that the lens barrel 108 has reached the reference position. The CPU 104 continues to output the zoom up signal according to the count of the PI signal for driving the lens barrel from the reference position to the wide angle end which is read from the E²PROM 105. The lens barrel 108 is extended and driven to the wide angle end.

Figure 4C:
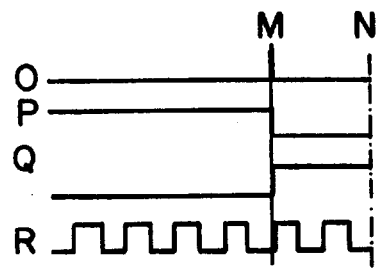

FIG. 4(C) shows the KYS (reference position) signal for the PI signal and the driving signals when the lens barrel 108 is driven from "B"–"D" to "C" wide angle end. "M" indicates the time when the lens barrel 108 reaches the reference position and "N" indicates the time when the lens barrel reaches the wide angle end position of the lens barrel 108.

The CPU 104 outputs a zoom down signal to the motor drive IC 106. The motor drive IC 106 outputs a signal for lens barrel driving signals "P" and "Q" to the lens barrel zoom motor 107. Then, the lens barrel zoom motor 107 retracts the lens barrel 108.

If the KYS (reference position) signal "O" has changed from low to high, the CPU 104 detects the fact that the lens barrel has reached the reference position change. Then CPU 104 outputs a zoom up signal to the motor drive IC 106 according to the count of the PI signal "R" for driving the lens barrel from the reference position to the wide angle end, the count being stored in the E²PROM 105. The motor drive IC 106 outputs driving signals "P" and "Q" to the lens barrel zoom motor 107. Then, the lens barrel zoom motor 107 extends the lens barrel 108.

Figure 4D:
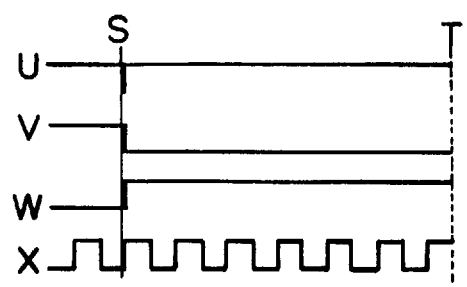

FIG. 4(D) shows barrel 108 is driven from "A"–"B" to "A". "S" indicates the time when the lens barrel 108 reaches the reference position and "T" indicates the time when the lens barrel 108 reaches the reset end position.

For example, there may be a case in which, when the battery has been removed for the purpose of replacing the battery in a condition in which the lens barrel 108 is not fully retracted, the position of the lens barrel 108 comes between the reference position and the reset end, and a new battery is installed.

The KYS (reference position) signal "U" is high, so the lens barrel 108 is extended until the reference point signal has become low. All the while, the CPU 104 outputs a zoom up signal to the motor drive IC 106. The motor drive IC 106 outputs the driving signals "V" and "W" to the lens barrel zoom motor 107, and the lens barrel 108 is extended. After the lens barrel 108 is extended, the CPU 104 detects that the KYS (reference position) signal has become low. When this happens, the CPU 104 outputs a signal to the motor drive IC 106 to retract the lens barrel 108 to the reset end according to the count of the PI signal "X" for driving the lens barrel 108 from "A"–"B" to "A" to the reset end within the $E^2$PROM. The motor drive IC 106 outputs the lens driving signals "V" and "W" signal to the lens barrel zoom motor 107, and the lens barrel 108 is retracted and driven to the reset end.

In the above explanation, the reference position is between the reset end and the W end of the lens barrel 108, and it can be used in a dual focus camera. The reference position may also be set between the telephoto end and the wide angle end. Also, the reference position may be set between the reset end and the focus start position.

Moreover, the reference position may be set at the reset end or the wide angle end by altering the data stored in the $E^2$PROM 105. By inputting data from the input terminal 110, through the CPU 104, the setting of the reset end position, wide angle end position or telephoto position may be written to the $E^2$PROM 105. Also, the setting of the reset position, wide angle end position or telephoto position written in the $E^2$PROM 105 can be read through the output terminal 111. For this reason, adjustment of the positions of the lens barrel 108 according to camera operation can be easily performed even after the camera has been assembled. Therefore, focus adjustment and zoom lens focal length adjustment can be easily performed.

In the camera according to the embodiment of the present invention described above, the reference point for positional control of the lens barrel with respect to the camera body has been set between the first position and the second position of the lens barrel, so the amount of the lens barrel driving from the reference position to the reset position or the wide angle end position is reduced, and therefore, accurate focal length adjustment or accurate autofocus control can be performed.

When a determination circuit, which determines the position of the lens barrel, determines that the lens barrel is in the first position, in which it is fully retracted into the camera body, the control unit performs control so that the lens barrel is held in the first position. Thus, the probability of a person dropping the camera body when the lens barrel is inadvertently driven decreases.

A photorefractor may be used instead of the photointerruptor 109 to count the number of pulses of the lens barrel from the reference position.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera having a camera body, a power supply source, a main switch to alternately enable connection of the power supply source to circuits in the camera, the camera comprising:
   a lens barrel having a first position fully collapsed within the camera body, a second position extending from the camera body when the power supply source is connected to the circuits, and a reference position with respect to the camera body, wherein the second position is a wide angle end position, and the reference position of said lens barrel with respect to the camera body is between the first position and the second position; and
   a controller to positionally control said lens barrel based upon distances of said lens barrel from the reference position.

2. The camera as claimed in claim 1, wherein:
   said lens barrel is a multiple focus lens; and
   the second position is the wide angle end position of the multiple focus lens.

3. The camera as claimed in claim 1, wherein:
   the second position is the autofocus start position of said lens barrel.

4. The camera as claimed in claim 1, further comprising:
   a pulse generating part to generate pulses according to movement of said lens barrel; and
   said controller positionally controlling said lens barrel based upon a number of the pulses.

5. The camera as claimed in claim 4, wherein:
   said pulse generating part is a photointerrupter.

6. The camera as claimed in claim 4, wherein:
   said pulse generating part is a photorefractor.

7. The camera as claimed in claim 1, further comprising:
   a determination unit to determine, when a battery is installed in the camera to power the camera, whether said lens barrel is one of at a first position fully collapsed within the camera body, extended less than the reference position and extended more than the reference position, and in response to said determination, said determination unit instructing said controller to extend said lens barrel to said reference position and back to the first position if said lens barrel is extended less than the reference position, to retract said lens barrel past the reference position and to the first position if said lens barrel is extended more than the reference position and maintaining said lens barrel in place if said lens barrel is at the first position.

8. The camera as claimed in claim 1, further comprising:
   a pulse generating part to generate pulses according to movement of said lens barrel: and
   said controller positionally controlling said lens barrel based upon a number of the pulses.

9. A camera having a camera body and powered by a battery, the camera comprising:
   a lens barrel having a first position fully collapsed within the camera body and a reference position with respect to the camera body extended from the first position;
   a position detector to determine pulse counts based upon movement of said lens barrel from the reference position, and to determine the position of the lens barrel based upon the reference position and the pulse counts;
   a controller to drive said lens barrel to the reference position upon insertion of the battery into the camera body; and
   a determination unit to determine whether said lens barrel is in the first position, and preventing said controller from driving said lens barrel to the reference position when the battery is inserted into the camera body and said lens barrel is in the first position.

10. The camera as claimed in claim 9, further comprising an EEPROM to store the reference position for access by said controller.

* * * * *